UNITED STATES PATENT OFFICE.

HOWARD L. BENDER, OF CLEVELAND, OHIO.

PROCESS OF MAKING ACETALDEHYDE.

1,355,299.  Specification of Letters Patent.  Patented Oct. 12, 1920.

No Drawing.  Application filed June 20, 1919. Serial No. 305,519.

*To all whom it may concern:*

Be it known that I, HOWARD L. BENDER, a citizen of the United States, residing at Cleveland, in the county of Cuyahoga and State of Ohio, have invented certain new and useful Improvements in Processes of Making Acetaldehyde, of which the following is a specification.

This invention relates to a process of producing acetaldehyde.

Attempts to produce acetaldehyde from acetylene gas have generally followed one or the other of two lines of development. In one the process involves passing acetylene through an acid solution containing a catalyzer such as one of the various metallic oxids, a mercury salt or other substance which produces the absorption of the acetylene gas and its combination with water. The second has involved the combination of steam and acetylene in the presence of one of various catalyzers.

The first method has been objectionable because the catalyzer is short lived and the method results in the production of sludge with the necessity of costly methods for regeneration thereof, aside from which the method is objectionable on account of polymerization of the acetaldehyde and the production of paraldehyde and croton aldehyde, with the necessity for separation or subsequent treatment. The steam acetylene method is objectionable because of the necessity for using extreme care in purification of the acetylene (U. S. Patent No. 1244901), and the necessity for relatively high temperatures to carry on the reaction. Acetaldehyde begins to decompose at approximately 400° C., and the best results so far obtained have been at higher temperatures than this, with increasing decomposition effect upon the product.

The present invention has for its object to provide an improved method of producing acetaldehyde which does away with acid solutions and avoids the production of sludge or polymerizing effects, and which method can be carried out at relatively low temperatures so as to avoid decomposition of the product.

According to my invention steam and acetylene are passed over a catalyzer or are brought into intimate relation in the presence of a catalyzer but at a relatively low temperature, the result being a decreasing cost for heat, the avoidance of loss of acetaldehyde by decomposition and the absence of poisoning effects of the catalyzer by impurities in the acetylene. Indeed, I have found in practice that the presence of what are ordinarily considered impurities in the acetylene has little if any effect upon the percentage of yield.

The foregoing results appear to be due to the nature and character of the catalyzer employed, which may vary to a considerable extent. The catalyzer includes a more or less porous or open base, one which provides a very large area or surface of contact for the gases passed thereover. This base may itself be more or less catalytic in nature, in which case it may be used alone. Usually, however, it serves as a base material for carrying or containing another substance having a more or less pronounced catalytic action for the reaction between steam and acetylene.

One substance suitable for the purpose is what is known as activated charcoal, to wit, that peculiar form of charcoal made from nut shells and pits, and other similar substances, and developed recently for gas mask use during the war. This material may also be used not only for its own catalytic action but also as a carrier for other substances, such as mercury, mercury salts, mercury oxid, or oxids or salts of various metals, such as zinc, copper, molybdenum, iron, nickel, tin, aluminum, lead, and the like. Under certain circumstances, silica or asbestos may be used as a base carrying other more catalytic substances. For example, I have used what is known as sil-o-cel, a finely divided form of fossilized shells (composition $SiO_2$) some of this material being impregnated with mercury oxid.

The base material may be impregnated with the catalytic substance in any suitable manner. Charcoal, for instance, may be impregnated with mercury by saturating it with mercury chlorid, adding ammonia and heating to such a temperature as to break up the mercury oxid into mercury. Other salts might be utilized for mercury impregnation in a similar manner, or mercury fumes may be disseminated through cold charcoal.

Charcoal may be impregnated with mercury oxid in the same manner by heating to a lower temperature. Silica may be impregnated in a similar manner with either mercury or mercury oxid.

Mercury oxid could also be dissolved in a suitable solvent, changed while distributed through the charcoal to the salt or oxid desired, and undesirable compounds removed by washing, heat or in any other suitable manner.

The foregoing are only a few of many ways of impregnating the base with the catalytic substance. The object in each case is to choose such a method as will disseminate the catalytic substance through the base material and exclude all other chemical compounds than the particular one desired.

Numerous trials with various kinds of catalyzers have shown that the reaction temperature at which combination takes place between steam and acetylene is lowered below the decomposition temperature of acetaldehyde, various catalyzers lowering it different amounts.

In carrying out the process steam and acetylene are mixed in any suitable proportions and are passed through a tube or container in which the catalyzer is located. For various reasons an excess of steam is usually employed. I have varied the proportions of gases widely but in the runs herein referred to the gases were mixed in the proportion of 200 volumes of steam to 10 volumes of acetylene. The temperature of the catalyzer is regulated in any suitable manner, such as by using electric resistance elements which can be turned off or on as the thermometer or pyrometer shows variations from the temperature desired. The gaseous product is passed through any efficient condenser where the acetaldehyde is collected. Any uncombined gas may be returned and used over again.

One of the best catalyzers so far utilized is the activated charcoal, before described, impregnated with a small proportion of mercury oxid, say one-half to one per cent. A mixture of steam and acetylene was passed through a tank containing this catalyzer at the rate of one liter per sq. cm. cross section per minute. The pressure was very slightly above atmospheric, just sufficient to cause flow or travel of the gas stream. With the charcoal-mercury oxid catalyzer just referred to, it was found that the percentage of yield of acetaldehyde increased with decreasing temperature, varying from 90% at 103° to 30% at 190°. Activated charcoal alone gave an increasing yield as the temperature was maintained higher, rising to 25% at a temperature of 350°, above which temperature the percentage of yield decreased. Activated charcoal impregnated with mercury gave a yield increasing to 30% at a temperature of 250°, above which temperature the yield decreased. Activated charcoal impregnated with copper oxid gave a yield increasing from 5% at 220°, 15% at 250°, 30% at 280° and 90% at 305°. Silica impregnated with mercury oxid gave a yield increasing up to 8% at 140° and 20% at 225°. Activated charcoal impregnated with mercuric sulfate gave a yield increasing from 10% at 130° to 36% at 250° C. Activated charcoal impregnated with zinc oxid gave a yield increasing from 10% at 200° to 85% at 310°. Activated charcoal impregnated with molydenum oxid gave a yield increasing from 2% at 220° to 70% at 340°.

In each case the proportion of catalytic substance to charcoal or silica base was approximately 1% or less. Normal charcoal may also be substituted for activated charcoal but the yield is slightly less, due no doubt to the more open form of the activated charcoal and the greater amount of surface of contact.

When the catalyst, such as activated charcoal, loses its catalytic action to any extent whatsoever it may be fully regenerated by simply heating to a moderately high temperature in the presence of a limited amount of air.

The method described largely increases the yield, preserves the life of the catalyzer and avoids the necessity for extreme care in the purification of acetylene.

What I claim is:—

1. The process of making acetaldehyde, consisting in producing a reaction between steam and acetylene in the presence of a catalyzer at a temperature below 400° C.

2. The process of making acetaldehyde, consisting in producing a reaction between steam and acetylene in the presence of a catalyzer at a temperature below the decomposition temperature of acetaldehyde.

3. The process of making acetaldehyde, consisting in producing a reaction between steam and acetylene in the presence of a base material containing a catalyzer at a temperature below the decomposition temperature of acetaldehyde.

4. The process of making acetaldehyde, consisting in producing a reaction between steam and acetylene in the presence of a catalyzer including charcoal at a temperature below 400° C.

5. The process of making acetaldehyde, consisting in producing a reaction between steam and acetylene in the presence of a catalyzer including charcoal at a temperature below the decomposition temperature of acetaldehyde.

6. The process of making acetaldehyde, consisting in producing a reaction between steam and acetylene at a temperature below 400° C. in the presence of a catalyzer composed of charcoal impregnated with a catalytic substance.

7. The process of making acetaldehyde, consisting in producing a reaction between steam and acetylene at a temperature below the decomposition temperature of acetaldehyde in the presence of a catalyzer composed of charcoal impregnated with a catalytic substance.

8. The process of making acetaldehyde, consisting in producing a reaction between steam and acetylene at a temperature below the decomposition temperature of acetaldehyde in the presence of a catalyzer composed of charcoal impregnated with a compound of a metal.

9. The process of making acetaldehyde, consisting in producing a reaction between steam and acetylene at a temperature below the decomposition temperature of acetaldehyde in the presence of a catalyzer composed of charcoal impregnated with a mercurial catalytic substance.

10. The process of making acetaldehyde, consisting in producing a reaction between steam and acetylene at a temperature below the decomposition temperature of acetaldehyde in the presence of a catalyzer composed of charcoal impregnated with an oxid of mercury.

In testimony whereof I affix my signature.

HOWARD L. BENDER.